Figure 1:
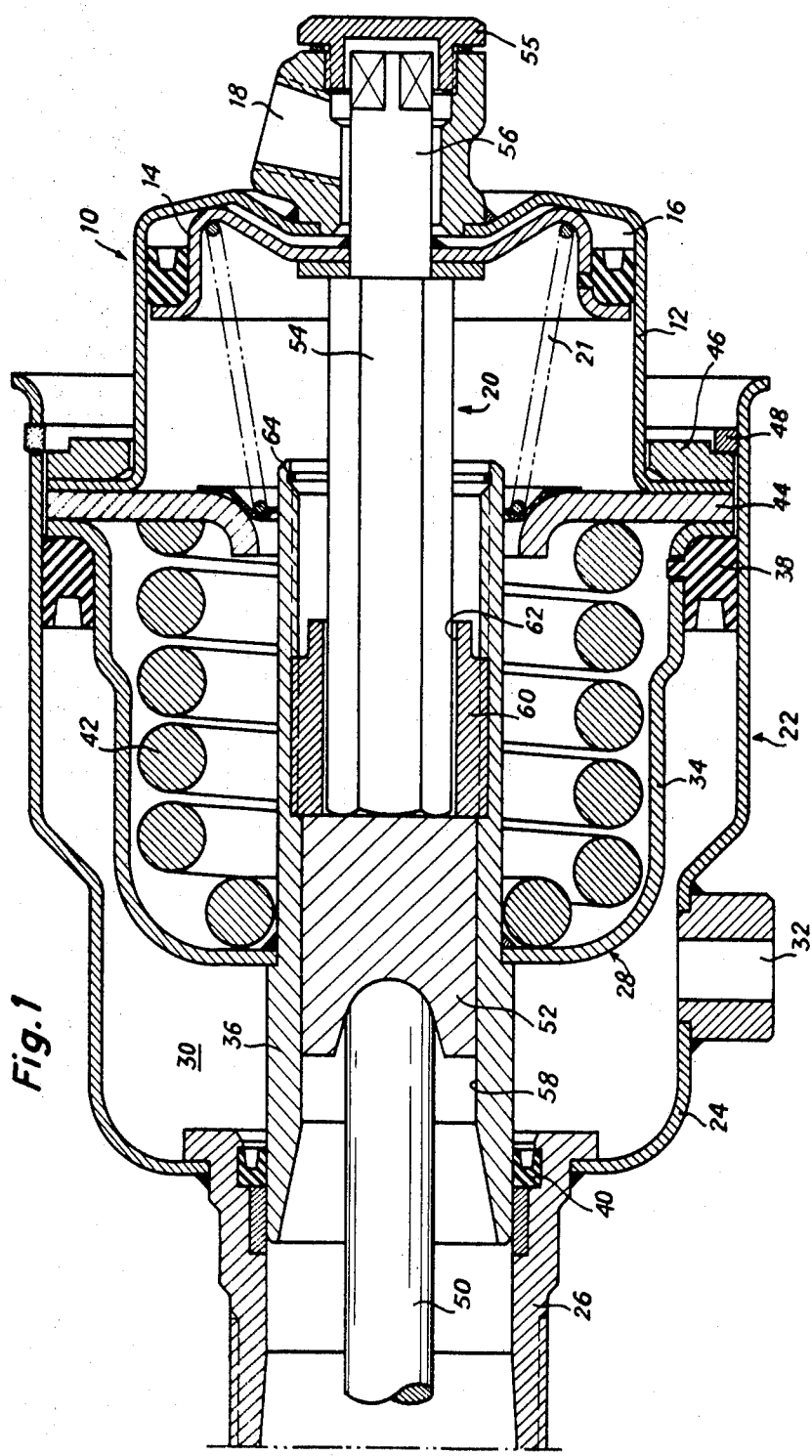

United States Patent

[11] 3,576,152

| [72] | Inventor | Gerard Chevreux<br>Bois Colombes, France |
|---|---|---|
| [21] | Appl. No. | 822,916 |
| [22] | Filed | May 8, 1969 |
| [45] | Patented | Apr. 27, 1971 |
| [73] | Assignee | Societe Anonyme D.B.A. |
| [32] | Priority | May 14, 1968 |
| [33] | | France |
| [31] | | 151,679 |

[54] BRAKE OPERATING MECHANISM
5 Claims, 2 Drawing Figs.

[52] U.S. Cl. .................................................. 92/65,
188/170
[51] Int. Cl. .................................................. F01b 7/10
[50] Field of Search .......................................... 92/63, 64,
48, 65; 188/106 (P), 152.02, 303.9, 170,
(Inquired); 60/595 (P), 54.6, (Inquired)

[56] References Cited
UNITED STATES PATENTS

| 3,181,433 | 5/1965 | Cruse | 92/65X |
| 3,187,642 | 6/1965 | Cruse | 92/63X |
| 3,244,079 | 5/1966 | Herrera | 92/63 |
| 3,302,530 | 2/1967 | Dobrikin et al. | 91/440 |
| 3,372,623 | 3/1968 | Wearden et al. | 92/63 |

*Primary Examiner*—Martin P. Schwadron
*Assistant Examiner*—Leslie J. Payne
*Attorneys*—C. F. Arens and Plante, Arens, Hartz, Hix and Smith

ABSTRACT: A brake operating mechanism includes a housing defining a chamber therewithin and a first tubular member slidably mounted in the chamber and extending therefrom. The outer surface of a second tubular member is threadedly engaged with the first tubular member, and the inner diameter of the second tubular member has a polygonal cross section, which slidably receives a shaft which has a corresponding polygonal cross section. A brake actuating rod is urged into engagement with the end of the second tubular member. A spring yieldably urges the actuating rod and the tubular members in a brake applying direction, but is normally opposed by fluid pressure in the chamber. The brake may be released after application by the resilient means by turning the shaft to move the second tubular member away from the actuating rod.

BRAKE OPERATING MECHANISM

This invention relates to a brake operating mechanism adapted to control the actuation of at least one brake device of any suitable mechanically actuated type connected thereto.

More particularly the invention relates to a brake operating mechanism of the type described in U.S. Pat. No. 2,809,723 comprising a conventional brake cylinder operative to actuate a push rod to be connected to the control member of the brake and a spring actuator operatively arranged between said brake cylinder and said control member around said push rod to actuate the latter in the event the fluid pressure to said spring actuator falls below a predetermined value.

It is to be noticed that such a type of brake operating mechanism is to be considered as different from the other known type wherein the spring actuator is located upstream from the brake cylinder so as to be capable of actuating in a brake-applying direction the pressure responsive movable wall thereof together with the push rod connected thereto in the event of a power failure. In effect, with the type of brake operating mechanism which the invention relates to, the push rod may be actuated by the spring actuator without urging the pressure responsive movable wall of the brake cylinder in a brake-applying direction. It results therefrom that the brake cylinder may be of the hydraulic type since there is no succion effect in the pressure chamber of the brake cylinder during an emergency actuation of the brake by the spring actuator. Furthermore, due to the relative location of the fluid pressure chambers of the brake cylinder and the spring actuator with respect to the chamber of the mechanism connected to the atmosphere, all the various seals warranting the fluid tightness of these pressure chambers are located between one of said pressure chambers and the atmosphere so that an eventual leakage in anyone of these seals results in a fluid leakage from the adjacent pressure chamber and the atmosphere and not in any way from one pressure chamber to the other as it may be the case in the other type of brake-applying mechanism cited thereinabove. It is also to be noted that the relative location of these pressure chambers permits to adapt easily any type of brake cylinder to any known type of spring actuator since there is no need of providing a fluid seal therebetween as it will be understood by anyone skilled in the art. Thus, the pushrod does not extend through the end wall of the brake cylinder to engage the piston thereof which results in a good fluid tightness of the pressure chamber of the brake cylinder, whatever may be the type of fluid used for operating the latter.

With such a type of brake operating mechanism, the problem has been raised to mechanically release the brake after the latter has been applied by the spring actuator upon a loss of pressure, so as to permit an auxiliary emergency control of the brake by the service brake cylinder or towing the vehicle whenever the available fluid pressure to the pressure chamber of the spring actuator is not sufficient to overcome the brake-applying spring force generated by said actuator. It has been already proposed to provide an adjustable connection between the piston assembly of the actuator and the push rod but such a connection which was only provided to adjust the relative position of the push rod on the piston assembly engaged therewith is not easily accessible after the mechanism is secured to the vehicle due to the location of this connection between the spring actuator and the brake control member. Furthermore, such an adjustable connection cannot be accessible in the event the brake operating mechanism is used in connection with a wedge brake wherein, for reasons which will be easily understood, the casing of the spring actuator is to be effectively secured to the wheel cylinder housing of the brake.

Accordingly the main object of the invention is to provide a brake operating mechanism of the type comprising from upstream to downstream a first brake actuator of the fluid pressure type, the pressure responsive movable wall of which is adapted when subjected to a service fluid control pressure to actuate in a brake-applying direction a brake-applying push rod assembly, and a second brake actuator of the pressure responsive spring type, the movable piston assembly of which coaxially arranged around said push rod assembly is adapted to engage the latter through an adjustable abutting connection provided between said assemblies so as to actuate said push rod assembly in a brake-applying direction in the event the fluid pressure from a fluid power source acting on said piston assembly against the load of brake-applying resilient means is below a predetermined value characterized in that manually operable adjusting means accessible from outside said second brake actuator are operatively connected to said adjustable abutting connection for axially adjusting same with respect to one of said assemblies.

Figure 2:
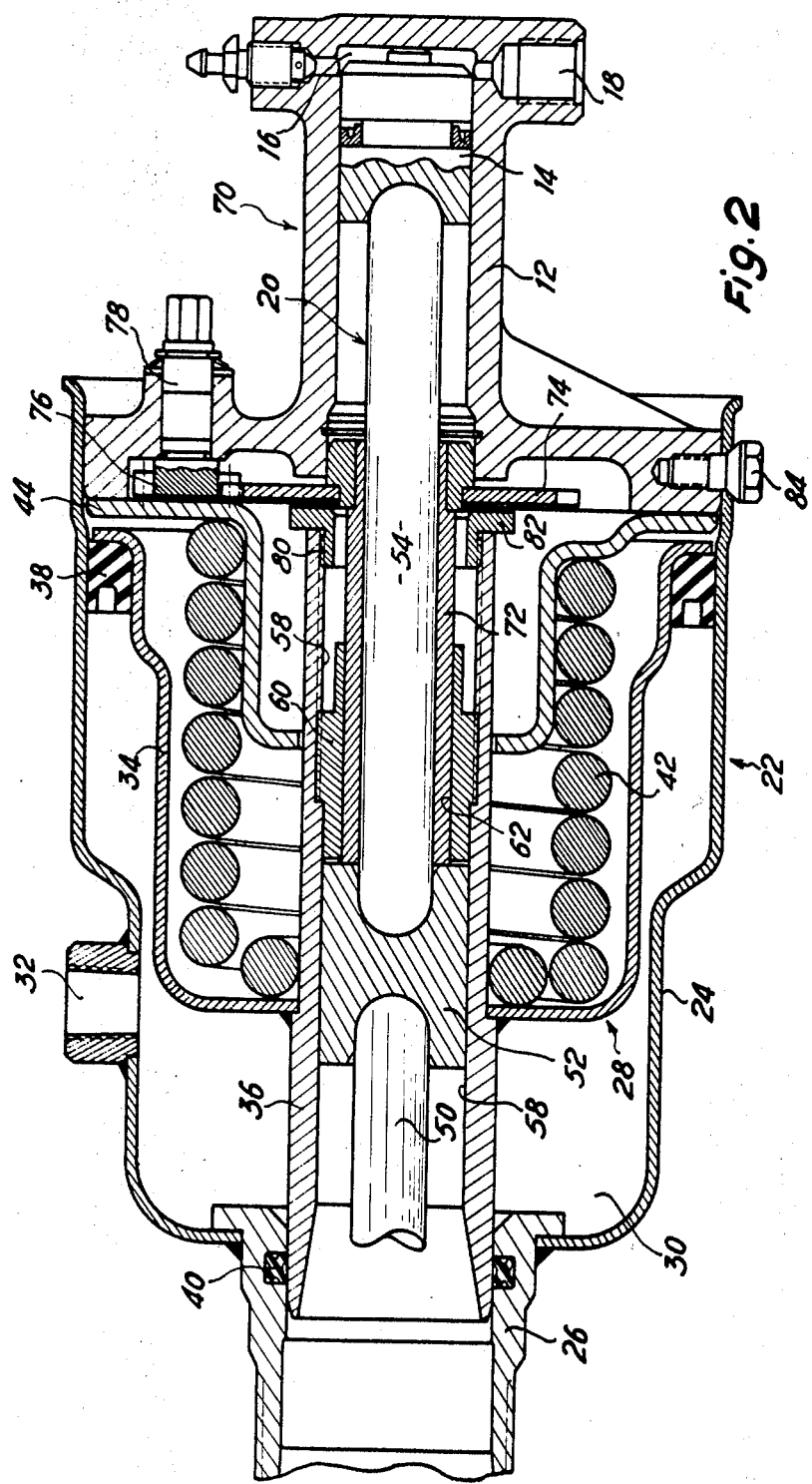

Other objects and advantages of the invention will appear from the following description taken in connection with the accompanying drawings in which:

FIG. 1 is a cross-sectional view of a brake operating mechanism according to the invention; and FIG. 2 is a cross-sectional view of another embodiment of a brake operating mechanism according to the invention.

Referring to FIG. 1, reference numeral 10 designates a first brake cylinder or actuator having a pot or casing 12 in which is sealingly mounted a movable pressure responsive wall such as an actuating piston 14 which defines with casing 12 a variable volume pressure chamber 16 connected to an inlet orifice 18. Orifice 18 is adapted to be connected to a pneumatic service pressure source (not shown) controlled by the operator of the vehicle. When actuated by a control pressure in chamber 16, piston 14 is adapted to move a push rod assembly, generally indicated by 20, in a brake-applying direction (toward the left when considering FIG. 1). A return spring 21 located within casing 12 urge piston 14 toward the brake released position.

Actuator 10 is operatively connected to a second brake cylinder 22 of the spring type having a pot or casing 24 including a tubular portion 26 sealingly secured thereto, as by welding, and particularly adapted to be suitably secured to the wheel cylinder housing of a wedge brake (not shown). Within casing 24 and portion 26 is slidably mounted a stepped piston assembly 28 which defines with casing an annular variable volume pressure chamber 30 connected to an input orifice 32. Orifice 32 is adapted to be connected to a pneumatic pressure source (not shown) such as a power reservoir of air under pressure. The slidable piston assembly 28 comprises a pressure responsive annular piston element 34 and a tubular member 36 sealingly secured thereto surrounding the push rod assembly 20. Two annular seals 38 and 40 are provided between the piston element 34 and casing 24 and between tubular member 36 and tubular portion 26 of casing 24 respectively to warrant the fluid tightness of the annular pressure chamber 30. A heavy preloaded spring 42 coaxially arranged around tubular member 36 is compressed between piston element 34 and an annular end wall 44 suitably connected to casing 24. In the shown example, spring 42 urges the annular outer edge of the wall 44 together with the annular outer edge of casing 12 in abutment against an annular ring 46 removably secured to casing 24 as by a snap ring 48 suitably engaged therein.

The push rod assembly 20 adapted to actuate the wedge brake (not shown) comprises an output portion 50 adapted to be connected to the movable wedge forming element (not shown) of the brake, a central cylindrical portion 52 slidably received in the tubular member 36 in abutting connection with portion 50, a main portion 54 adapted to engage portion 52 when actuated by the piston 14 sealingly connected thereto, and a protruding portion 56 extending from piston 14 into chamber 16 and operatively connected to the main portion 54 for movement therewith. In the shown example, portion 56 is integral with portion 54, piston 14 being suitably secured to the latter as by welding. A plug 55 is removably secured to casing 12 to permit access to the protruding portion 56.

The axially extending inner passage 58 of tubular member 36 is threaded to receive an annular threaded abutting nut element 60 which is operative to engage the shoulder forming outer edge of portion 52 of the push rod assembly 20. The main portion 54 of the push rod assembly 20, which extends through the axially extending passage 62 of the annular abutting element 60, is connected thereto by a slidable but not rotatable connection so that the rotation of element 60 and thus the axial position thereof with respect to tubular member 36 may be controlled by a controlled actuation in rotation of the main portion 54 of the push rod assembly 20. In the shown example, the main portion 54 is provided with a polygonal cross section so as to cooperate with a corresponding polygonal cross section provided in passage 62. A snap ring 64 is operatively arranged on the sidewall of the threaded portion of inner passage 58 to prevent escape of nut element 60 from member 36.

The brake actuating device described hereinabove operates as follows. In normal operation, the pressure from the pressure source to chamber 30 is sufficient to overcome the load of the spring 42 so that piston assembly 28 is urged to the brake released position in abutment against the end wall 44. Piston 14 is urged by spring 22 in the brake released position to engage the rear end wall of casing 12. Upon controlled braking operation, the fluid pressure from the pressure source as controlled by the operator is sent to chamber 16 through orifice 18 to urge piston 14 and the push rod assembly 20 engaged therewith in a brake-applying direction, toward the left as seen in the drawing to cause a service actuation of the brake. If a failure occurs in the fluid pressure supply systems, the pressure in chamber 30 falls below the value balancing the load of the spring 42. Piston assembly 28 is thus biased by the spring 42 toward the left as seen in the drawing so as to move the portions 50 and 52 of the push rod assembly in a brake-applying direction through the abutting connection defined by the nut element 60 connected to the tubular member 36 and engaging push rod portion 52.

In the event the failure of the supply system cannot be repaired, piston assembly 28 remains in its brake-applying position preventing the releasing of the brake. Assuming such a pressure loss, it is, however, possible to manually release the brake without compressing the heavy spring 42 by rotating the protruding portion 56 and the main portion 54 connected thereto in a direction causing the unscrewing of the abutting element 60 with respect to the piston assembly 28, after the plug 55 has been removed from the casing 12. Such an unscrewing of nut element 60 results in a controlled displacement of the push rod portions 50 and 52 engaged therewith toward a brake released position until push rod portion 52 engages main portion 54.

It is to be noticed that the brake-applying displacement of piston assembly 28 does not result in a corresponding displacement of the piston 14 of the first actuator 10, due to abutting connection between push rod portions 52 and 54 and to the slidable arrangement of main portion 54 within passage 62 of the abutting element 60 connected to the spring loaded piston assembly 28. It is also to be noticed that the provision of the portion 52 freely arranged within the cylindrical passage 58 facilitates the unscrewing rotation of main portion 54 and element 60 actuated thereby.

Referring now to FIG. 2, there is shown therein another embodiment of the brake operating mechanism shown in FIG. 1 and in said FIG. 2 the same reference numerals have been used to designate similar or analogous parts. The main difference between the mechanism of FIG. 2 and of FIG. 1 consists of the substitution of a brake cylinder of the hydraulic type 70 for the pneumatic brake actuator 10 of FIG. 1. Furthermore, the abutting element 60 is rotated by a sleeve member 72 slidably mounted on the main portion 54 of the push rod assembly 20 engaged by the piston 14 of the brake cylinder 70. Sleeve 72 is rotatably driven by a toothed wheel 74 suitably secured thereto which cooperates with an input control pinion 76 secured to an input shaft 78 rotatably mounted on casing 12 of the brake cylinder 70. The free end of shaft 78 extending toward the exterior of casing 12 is advantageously provided with a polygonal cross section so as to be driven in rotation by any suitable tool. It is also to be noted that the ring 64 of FIG. 1 limiting the rear travel of nut 60 within the threaded bore portion 58 of the piston assembly 28 is replaced by an annular threaded collar 80 threadedly secured within bore 58 and having an annular flange 82. Flange 82 prevents dissociation of the end wall 44 from the piston assembly 28 under the action of spring 42 upon dismounting of the brake cylinder 70 from the spring actuator casing 24 to which the casing 12 of cylinder 70 is operatively connected by a plurality of bolts 84.

I claim:
1. In a brake operating mechanism:
a housing defining a chamber therewithin;
a first tubular member slidably mounted in said housing and extending from one end of the latter;
a piston slidable in said chamber engaging said tubular member;
resilient means yieldably urging said piston toward said one end of the chamber;
means communicating pressurized fluid into said chamber for driving said piston away from said one end of the chamber against the bias of said resilient means;
a control rod slidably mounted in said tubular member and projecting from said one end of the housing;
a second tubular member received within said first tubular member, the outer circumferential surface of said second tubular member threadedly engaging the inner circumferential surface of said first tubular member the inner circumferential surface of said second tubular member having a polygonal cross section;
one end of said second tubular member engaging the end of the control rod to prevent movement of the latter toward the other end of the housing;
another member having a polygonal cross section slidably receiver within said second tubular member; and
said another member being rotatable to thereby rotate said second tubular member to move the latter toward the other end of the bore to permit movement of the control rod toward said other end of the bore.
2. The invention of claim 1:
said another member being a shaft having a portion extending from the other end of the housing to permit rotation of the latter from the exterior of the housing.
3. The invention of claim 1:
a rotatable input member extending from said housing; and
a gearing mechanism operably connecting the input member with said another member to rotate the latter upon rotation of the input member.
4. The invention of claim 3:
said input member extending from said other end of the housing.
5. The invention of claim 1:
a push rod extending into said tubular members;
a pressure responsive movable wall for actuating said push rod;
said another member being a sleeve engaging said second tubular member;
said push rod being coaxial with said sleeve;
a rotatable input member extending from said housing; and
a gearing mechanism operably connecting said input member with said sleeve to permit rotation of the latter upon rotation of the input member.